United States Patent
Bossman et al.

(10) Patent No.: US 9,063,973 B2
(45) Date of Patent: Jun. 23, 2015

(54) METHOD AND APPARATUS FOR OPTIMIZING ACCESS PATH IN DATABASE

(71) Applicant: International Business Machines Corporation, Armonk, NY (US)

(72) Inventors: Patrick D. Bossman, Sarasota, FL (US); You-Chin Fuh, San Jose, CA (US); Ke W. Wei, Beijing (CN); Jing Zhou, Beijing (CN); Xiang Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 195 days.

(21) Appl. No.: 13/721,585

(22) Filed: Dec. 20, 2012

(65) Prior Publication Data

US 2013/0159321 A1   Jun. 20, 2013

(30) Foreign Application Priority Data

Dec. 20, 2011   (CN) .......................... 2011 1 0430263

(51) Int. Cl.
   G06F 17/30   (2006.01)

(52) U.S. Cl.
   CPC .... *G06F 17/30424* (2013.01); *G06F 17/30463* (2013.01)

(58) Field of Classification Search
   CPC ................. G06F 17/30424; G06F 17/30463
   See application file for complete search history.

(56) References Cited

U.S. PATENT DOCUMENTS

| | | | | |
|---|---|---|---|---|
| 4,956,774 A | * | 9/1990 | Shibamiya et al. | .................... 1/1 |
| 7,124,148 B2 | * | 10/2006 | Sauermann | ................... 707/740 |
| 7,447,676 B2 | * | 11/2008 | Zait et al. | .............................. 1/1 |
| 7,668,804 B1 | * | 2/2010 | El-Helw et al. | ............... 707/719 |

OTHER PUBLICATIONS

"Query Optimization," downloaded from Oracle website Oct. 24, 2011.
Lynch, Clifford A., "Selectivity Estimation and Query Optimization in Large Databases with Highly Skewed Distributions of Column Values," Proceedings of the 14th VLDB Conference, 1988.
Hanson, Eric N., "Statistics Used by the Query Optimizer in Microsoft SQL Server 2005," downloaded from Microsoft website Oct. 24, 2011.

* cited by examiner

*Primary Examiner* — Neveen Abel Jalil
*Assistant Examiner* — Kilpatrick L Jones
(74) *Attorney, Agent, or Firm* — Nelson Mullins Riley & Scarborough LLP

(57) ABSTRACT

Apparatuses and methods for optimizing access path are provided. Execution of a query statement is sampled to obtain the information about a plurality of executing instances, the information about each executing instance comprises the literal value of the query statement in the instance and the filter factor corresponding to the literal value. The plurality of instances are grouped into a plurality of groups based on the filter factors corresponding to the literal values. The average filter factor of each group and the occurrence frequency of the group are obtained. The candidate access path created for the average filter factor of each group is accordingly obtained, and by taking the occurrence frequencies as weights, the weighted execution cost of each candidate access path is calculated for each group. The candidate access path with the minimum sum of the weighted execution costs for all groups is determined as the optimal access path.

16 Claims, 5 Drawing Sheets

| Instance No. | Literal value | Filter factor | Additional information |
|---|---|---|---|
| 1 | China | 88.6% | Usage frequency 89% |
| 2 | China | 88.6% | |
| 3 | China | 88.6% | |
| 4 | Cambodia | 1.0% | Usage frequency 1% |
| 5 | Vietnam | 5.6% | Usage frequency 6% |
| 6 | Thailand | 4.5% | Usage frequency 4% |
| ... | ... | ... | ... |
| 100 | China | 88.6% | |

| Instance No. | Literal value | Filter factor | Additional information |
|---|---|---|---|
| 1 | China | 88.6% | Usage frequency 89% |
| 2 | China | 88.6% | |
| 3 | China | 88.6% | |
| 4 | Cambodia | 1.0% | Usage frequency 1% |
| 5 | Vietnam | 5.6% | Usage frequency 6% |
| 6 | Thailand | 4.5% | Usage frequency 4% |
| ... | ... | ... | ... |
| 100 | China | 88.6% | |

| Class No. | Filter factor | Occurrence frequency |
|---|---|---|
| 1 | 88.6% | 89% |
| 2 | 5.6% | 6% |
| 3 | 4.5% | 4% |
| 4 | 1.0% | 1% |

Fig. 5A

| Group No. | Average filter factor | Occurrence frequency |
|---|---|---|
| 1 | 88.6% | 89% |
| 2 | 4.8% | 11% |

Fig. 5B

| Access path | Group No. | Filter factor | Execution cost |
|---|---|---|---|
| A | 1 | 88.6% | 485 |
| A | 2 | 4.8% | 900 |
| B | 1 | 88.6% | 1000 |
| B | 2 | 4.8% | 750 |

Fig. 6A

| Access path | Group No. | Filter factor | Occurrence frequency | Execution cost | Weighted execution cost |
|---|---|---|---|---|---|
| A | 1 | 88.6% | 89% | 485 | 430 |
| A | 2 | 4.8% | 11% | 900 | 102 |
| B | 1 | 88.6% | 89% | 1000 | 886 |
| B | 2 | 4.8% | 11% | 750 | 85 |

Fig. 6B

| Instance No. | Literal value | Filter factor |
|---|---|---|
| 1 | <'M','DESIGNER'> | <0.8, 0.4> |
| 2 | <'M','DESIGNER'> | <0.8, 0.4> |
| 3 | <'F', 'SALESREP'> | <0.2, 0.3> |
| 4 | <'M', 'ENGINEER'> | <0.8, 0.2> |
| 5 | <'F', 'SALESREP'> | <0.2, 0.3> |
| 6 | <'F', 'ENGINEER'> | <0.2, 0.2> |
| ... | ... | ... |
| 100 | <'M','DESIGNER'> | <0.8, 0.4> |

Fig. 7A

| Group No. | Average filter factor | Occurrence frequency |
|---|---|---|
| 1 | <0.8, 0.4> | 40% |
| 2 | <0.2, 0.3> | 30% |
| 3 | <0.2, 0.2> | 30% |

Fig. 7B

| | Access path A | Access path B | Access path C |
|---|---|---|---|
| Group 1 | 100 | 230 | 680 |
| Group 2 | 203 | 93 | 360 |
| Group 3 | 510 | 420 | 120 |
| Total cost | 813 | 743 | 1160 |

Fig. 7C

METHOD AND APPARATUS FOR OPTIMIZING ACCESS PATH IN DATABASE

CROSS-REFERENCE TO RELATED APPLICATIONS

The present Application for patent claims priority to Chinese Patent Application No. 201110430263.2, entitled "METHOD AND APPARATUS FOR OPTIMIZING ACCESS PATH IN DATABASE" and filed Dec. 20, 2011, which is expressly incorporated by reference herein.

TECHNICAL FIELD

The present invention relates to accessing a database, and more particularly, to a method and apparatus for optimizing an access path in a database.

BACKGROUND

During the process of accessing a database and searching it, in order to conduct a query, there is need for the database to establish an access plan. The access plan defines in what order tables are accessed, which indexes are used, and what joining method is used to link data. A good access plan is very important for Structured Query Language (SQL) statements to be rapidly executed. Most Relational Database Management Systems (RDBM) create access plans using cost based optimizer. The cost based optimizer estimates the costs of each candidate access path according to the statistics information in the database, and selects the access path with the minimum cost as the optimal path. The above mentioned cost mainly comprises Central Processing Unit (CPU) execution cost, Input/Output (IO) cost, and so on.

When calculating the costs of each candidate access path, the optimizer performs the estimation mainly according to the statistics information related to tables and indexes in the database as well as filter factors of a query statement. A filter factor is, when "filtering" with a specified condition in a query statement, the ratio of data entries selected from a specified range of a database to the total data entries of the specified range. The filter factor is very important for the optimizer to create an effective access plan.

In a very simple example, suppose that a database comprises a Sales Information Table T for a computer accessory consisting of 100 rows, in which 95 rows relate to Model A and 5 rows relate to Model B, and the model information is recorded in the 2nd column. If a query is conducted using the query statement SELECT*FROM T WHERE COLUMN_2='A', that is, filtering by using Model=A as the predicate, 95 data entries will be returned and the filter factor will be 95%. For such a filter condition and filter factor, the optimizer of the Database Management System can conclude from simple calculation that it is an economic access path to directly scan and judge each row of Table T, and read the data entries where the $2^{nd}$ column is A. In another case, if filtering is performed using Model=B as the predicate, 5 data entries will be returned and the filter factor will be 5%. In this case, the optimizer can conclude from calculation that it is a preferable access path to first read the index of the table, and then directly access the data entries where the $2^{nd}$ column is B according to the pointer recorded in the index. Thus, it can be seen that the filter factor plays a very important role in the process of the optimizer creating an access plan. The optimizer usually creates different access paths according to different filter factors. Furthermore, the value of the filter factor is closely dependent on the distribution of data in tables and the literal value of the filter condition designated in a query statement, i.e. 'A' or 'B' in the above example.

In many cases, however, the filter factor cannot be obtained simply and directly like the above examples. For example, in the case of typical embedded SQL, the SQL statement is embedded into a host application, and cites in the query statement the host variable(s) or parameter(s) of the host application, for example, SELECT*FROM T WHERE COLUMN_2=var1, where var1 is a variable. Hence, the literal value in the filter condition and the value of the filter factor are directly dependent on the value of the host variable(s). However, generally, the values of the host variables cannot be determined until the application is executed. In addition, in some cases, the application executes the same query statement repeatedly for many times, but each time it executes the query statement, the value of the variable generated may be different. As there is no way to precisely determine the literal value of the filter condition before the query statement is executed, many methods have been proposed to estimate filter factor in order to optimize the access path.

In an access path optimizing solution, the optimizer estimates a possible filter factor based on the assumption that the values of the variables are evenly distributed, and creates an economic access path based on the estimated filter factor. After determining the access path for the query statement, each time the query statement is executed, database is accessed according to the pre-established access path. Still referring to the above example of Sales Information Table T for a computer accessory, for the query statement SELECT*FROM T WHERE COLUMN_2=var1, since the $2^{nd}$ column contains two possible values A and B, the optimizer may averagely deem that the filter factor of the query statement is 50%, and create a constant access path based on the filter factor. It can be seen that, in this optimizing solution, the access path is predetermined, and thus it has the advantages of stability and predictability. However, in the case that the distribution of data in tables deviates from the assumption of even distribution, the filter factor estimated by the solution will not be precise enough, thus obtaining an access plan with low efficiency.

In another optimizing solution, the optimizer supposes that the first literal value generated when the query statement is executed is more representative, and thus the estimated filter factor is closer to the actual situation compared with the supposition of even distribution. Accordingly, the optimizer creates access path based on thus estimated filter factor, and caches the created access path for use in subsequent execution of the query statement. Hence, each time the query statement is executed, the database is accessed according to the access path in the cache. Referring again to the above example of Sales Information Table T and the query statement SELECT*FROM T WHERE COLUMN_2=var1, if var1 is given the value of B when the query statement is executed for the first time, the optimizer will create access path based on the filter factor 5%. In this optimizing solution, it can be understood that, if the literal value B generated for the first time is really representative enough, or in other words, the occurrence frequency of the literal value B is large enough in the subsequent query execution, the created access path will be effective for the subsequent execution of the query statement. However, if the literal value generated for the first time happens not to be the most frequently used value, for example, all the var1 values are A during subsequent execution, the access path created by the optimizer will cause the query statement to be subsequently executed with very low efficiency. Therefore, the execution performance of this optimizing solution fluctuates significantly, and is not stable enough.

In another optimizing solution, the optimizer performs dynamic optimization during the execution of query statement. Each time the query statement is executed, the optimizer estimates filter factor according to the actually generated literal values, and then creates an economic access path. This optimizing solution is effective to find out the optimal access path. However, as it has to re-estimate the filter factor and re-create the access plan every time, the cost of executing the optimizing solution may even possibly exceed the cost of executing the query, and the generated execution expense is often beyond a tolerable range. In addition, constantly generating or changing the access path would make it difficult to monitor and trace the access path.

In yet another optimizing solution, the optimizer re-estimates filter factor each time the query statement is executed, and judges whether the previously created access path is suitable for the newly obtained filter factor. If the filter factor is not compatible with the cached access path, a new access path will be created. Although this solution reduces some expenses compared with the solution of re-optimizing every time, it still has almost all the disadvantages. As the optimizer still needs to re-estimate filter factor each time the query statement is executed and re-optimize the access path if necessary, the cost is still high.

Therefore, a better optimizing solution is desired to improve the optimization performance of the database optimizer.

BRIEF SUMMARY

In view of the above questions, one or more embodiments of the present invention are proposed to improve the optimization effect and the execution efficiency of the access path optimization in database.

According to one embodiment of the present invention, a method is provided for optimizing an access path in a database. The method includes sampling execution of a query statement to obtain information about a plurality of executing instances, wherein the information about each executing instance comprises a literal value of the query statement in the executing instance and a filter factor corresponding to the literal value. The method also includes grouping the plurality of executing instances into a plurality of groups based on the filter factors corresponding to the literal values, and obtaining the average filter factor of each group and the occurrence frequency of the group. Moreover, the method includes obtaining the candidate access path created for the average filter factor of each group; and by taking the occurrence frequencies as weights, calculating a weighted execution cost of each candidate access path for each group, and determining the candidate access path with the minimum sum of the weighted execution costs for all groups as an optimal access path.

According to another embodiment of the present invention, an apparatus is provided for optimizing access path in database. The apparatus includes an instance information obtaining unit configured to sample execution of a query statement to obtain information about a plurality of executing instances, wherein the information about each executing instance comprises a literal value of the query statement in the executing instance and a filter factor corresponding to the literal value. The apparatus also includes a grouping unit configured to group the plurality of executing instances into a plurality of groups based on the filter factors corresponding to the literal values, and obtain the average filter factor of each group and the occurrence frequency of the group. Moreover, the apparatus includes a candidate path obtaining unit, configured to obtain the candidate access path created for the average filter factor of each group; and an optimal path determining unit, configured to, by taking the occurrence frequencies as weights, calculate a weighted execution cost of each candidate access path for each group, and determine the candidate access path with the minimum sum of the weighted execution costs for all groups as an optimal access path.

The method and apparatus according to the embodiments of the invention can obtain the usage information of literal values and filter factors based on the executing history of a query statement, and determine the preferred access path based on the usage information of filter factors. Thus, the obtained access path has a better probability of being suitable for the subsequent execution of the query statement, and therefore improves the effect of path optimization.

BRIEF DESCRIPTION OF THE SEVERAL VIEWS OF THE DRAWINGS

FIG. 5A shows an example of classes obtained from the executing instances of FIG. 3;

FIG. 5B shows an example of groups of executing instances;

FIG. 6A-6B show an example of execution costs of several access paths for several groups;

FIG. 7A shows another example of the information about executing instances;

FIG. 7B shows another example of groups of executing instances;

FIG. 7C shows an example of cross checking the execution costs of access paths;

DETAILED DESCRIPTION

Figures 1, 2:
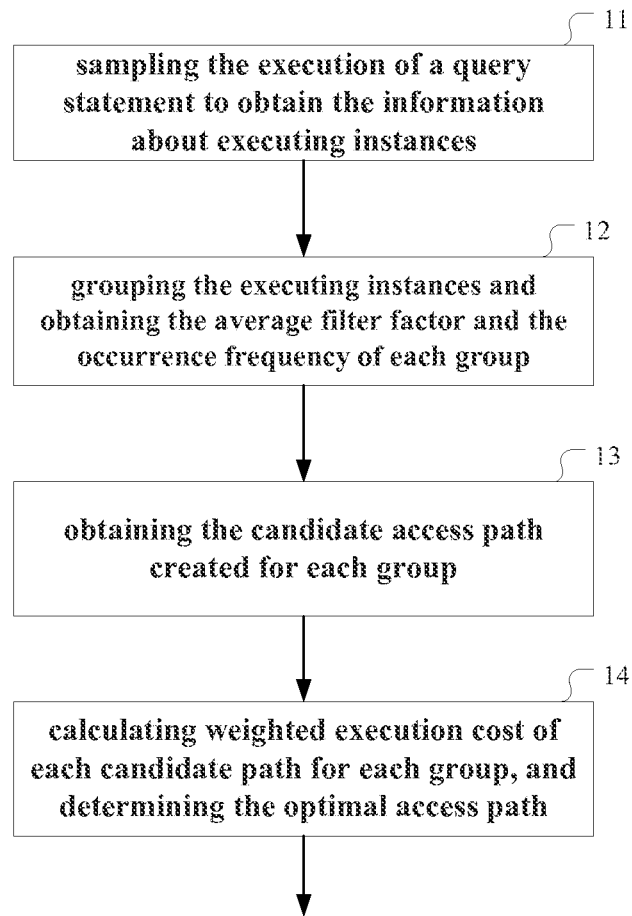
FIG. 1 is a flow chart showing a method for optimizing access path according to an embodiment of the invention.
FIG. 2 shows an example of the statistics information of a User Information Table T1.

As will be appreciated by one skilled in the art, aspects of the present invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium having computer usable program code embodied in the medium.

Any combination of one or more computer readable medium may be utilized. The computer readable medium may be computer-readable signal medium or computer-readable storage medium. The computer-readable storage medium may be, for example but not limited to, an electronic, magnetic, optical, electromagnetic, infrared, or semiconductor system, apparatus, device or any combinations thereof. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device or any proper combinations thereof. In the context of this document, a computer-readable storage medium may be any tangible medium that can contain, or store the program for use by or in connection with the instruction execution system, apparatus, or device.

Computer readable signal medium may include a propagated data signal with the computer-readable program code embodied therewith, either in baseband or as part of a carrier wave. Such propagated signal may use any proper form, including but not limited to, electromagnetic signal, optical signal, or any proper combination thereof. Computer readable signal medium may be any computer readable medium that is different from computer-readable storage medium and can communicate, propagate, or transport the program for use by or in connection with the instruction execution system, apparatus, or device.

Program code included in the computer readable medium may be transmitted using any appropriate medium, including but not limited to wireless, wired, optical fiber cable, RF, etc. or any proper combination thereof.

Computer program code for carrying out operations of the present invention may be written in any combination of one or more programming languages, including an object oriented programming language such as Java, Smalltalk, C++ or the like and conventional procedural programming languages, such as "C" programming language or similar programming languages. The program code may execute entirely on a user computer, partly on a user computer, as a stand-alone software package, partly on user computer and partly on a remote computer or entirely on a remote computer or server. In the latter scheme, the remote computer may be connected to the user computer through any type of network, including a local area network (LAN) or a wide area network (WAN), or the connection may be made to an external computer (for example, through the Internet using an Internet Service Provider).

Below, aspects of the invention will be described with reference to flowchart and/or block diagram of methods, apparatuses (systems) and computer program products of the embodiment of the invention. Note that, each block of the flowchart and/or block diagram, and combinations of blocks in the flowchart and/or block diagram, can be implemented by computer program instructions. These computer program instructions may be provided to a processor of a general-purpose computer, a special-purpose computer or other programmable data processing apparatus to produce a machine, such that the instructions which execute on the computer or other programmable data processing apparatus create means for implementing the functions/actions specified in the block(s) of the flowchart and/or block diagram.

These computer program instructions may also be stored in a computer-readable medium that can direct a computer or other programmable data processing apparatus to function in a particular manner, such that the instructions stored in the computer-readable medium produce an article of manufacture including instruction means which implement the functions/actions specified in the block(s) of the flowchart and/or block diagram.

The computer program instructions may also be loaded into a computer or other programmable data processing apparatus to perform a series of operational steps on the computer or other programmable data processing apparatus so as to produce computer implemented process, such that the instructions which execute on the computer or other programmable data processing apparatus will provide process for implementing the functions/actions specified in the block(s) of the flowchart and/or block diagram.

Next, embodiments of the invention will be described in conjunction with the drawings. It should be appreciated that the description of the following detailed examples are merely to explain the exemplary implementing modes, rather than to impose any limitation on scope of the invention.

In many embodiments of the invention, the execution history of the repeatedly executed query statement is taken into consideration, the usage information of the literal values in the query statement is obtained according to the historic statistics information, and then a preferred access path is estimated by considering the filter factors corresponding to the literal values in combination with the usage frequencies of the literal values.

FIG. 1 is a flow chart showing a method for optimizing an access path according to an embodiment of the invention. More particularly, the method is used to optimize the access path in a database for repeatedly executed query statements. As shown in the figure, the method of optimization comprises the following steps: step 11 of sampling the execution of a query statement to obtain the information about a plurality of executing instances, wherein the information about each executing instance comprises the literal value of the query statement in the executing instance and the filter factor corresponding to the literal value; step 12 of grouping the plurality of executing instances into a plurality of groups based on the filter factors corresponding to the literal values, and obtaining the average filter factor of each group and the occurrence frequency of the group; step 13 of obtaining the candidate access path created for the average filter factor of each group; and step 14 of, by taking the occurrence frequencies as weights, calculating the weighted execution cost of each candidate access path for each group, and determining the candidate access path with the minimum sum of the weighted execution costs for all groups as the optimal access path.

Next, the detailed implementing modes of the above steps will be described in conjunction with particular examples.

In one example, Table T1 is a statistics table for user information, in which a column COUNTRY records the nationality of users. In one application, it is required to repeatedly execute the query statement SELECT*FROM T1 WHERE COUNTRY=var for many times. In initial executing process, it may estimate the filter factor and create the access path based on, for example, the supposition of even distribution. In order to optimize the access path and make it more suitable for the subsequent execution of the query statement, in step 11, the process monitors and samples the execution of the query statement. In particular, during the previous executing process, each execution procedure of the query statement may be referred to as an executing instance. The execution of the query statement may be monitored in many ways in order to obtain the basic information about each executing instance. For example, the database usually records in the form of tracing the information about queries, including the parameters and literal values in queries, access paths, etc. The recording in database trace may be read to obtain the basic information about executing instances. Or alternatively, in another example, the process monitors the runtime of execution of the application which contains the query statement so as to obtain the assignment of the variable in each executing instance, i.e., the literal value of the query condition. Those skilled in the art may employ other methods to monitor the execution of query statement.

Monitoring and sampling on the execution of query statement may be carried out during a particular time period, which may be, for example, one day, one week, one month, and so on. In one example, the process may obtain the basic information about all executing instances within a specified time period; alternatively, in another example, the process may take samples partially in other ways. For example, the process may randomly sample part of executing instances within the executing time period.

For the plurality of executing instances obtained by sampling, the literal value in each executing instance may be easily obtained as described above. Furthermore, based on the obtained literal values, and in combination with the statistics information of Table T1, which the query statement is directed to, the process may estimate the filter factor that each literal value corresponds to. Those skilled in the art may understand that, in order to facilitate data query, there is statistics information about tables stored in the database. For example, the statistics information about Table T1 includes the possible values in each column, the distribution of these values, and the like. FIG. 2 shows an example of the statistics information of Table T1. This example shows the statistics information of the column COUNTRY in T1. In particular, in the statistics information of FIG. 2, the first column records the possible literal values in the column COUNTRY, and the second column records the occurrence profile of each literal value in the column COUNTRY of T1. It can be seen from the statistics information of FIG. 2 that, the column COUNTRY of T1 has 5 possible values in all, in which the value "China" occupies 886 rows out of the 1000 rows in T1, and thus has an occurrence frequency of 88.6%. Generally speaking, the occurrence frequency in statistics information may be considered as the estimated value of filter factor. Thus, the filter factor that each literal value corresponds to may be obtained.

In other cases, the filter condition or the predicate of the query statement may be very complex, and therefore it is difficult to obtain the filter factor by referring to the statistics information in database. In these cases, a "count" statement may be executed for the predicate to obtain the execution result of the query, and then the filter factor is calculated according to the execution result. It can be understood that those skilled in the art can estimate filter factor by employing various methods depending on various conditions.

Thus, for the plurality of executing instances obtained by sampling, the information about each executing instance may be obtained, including the literal value in the executing instance and the filter factor corresponding to the literal value.

Figures 3, 4:
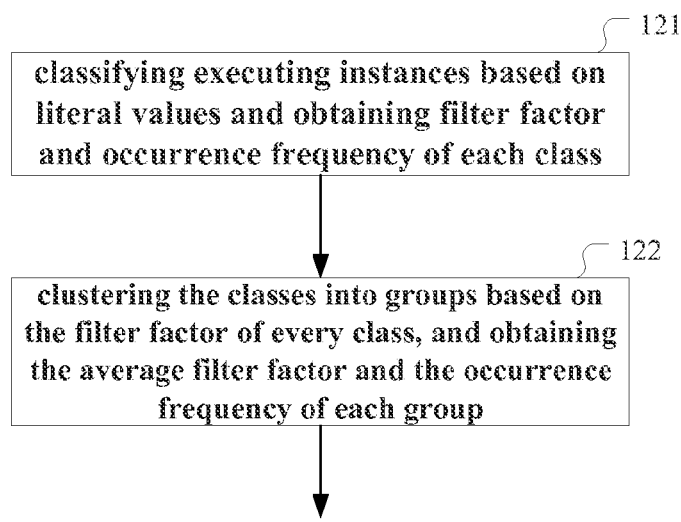
FIG. 3 shows an example of the information about executing instances.
FIG. 4 shows sub steps of the grouping step according to an embodiment of the invention.

In one example, by sampling the execution of the query statement SELECT*FROM T1 WHERE COUNTRY=var, 100 executing instances, and accordingly the literal value of each executing instance, are obtained. By combining the statistics information as shown in FIG. 2, the filter factors corresponding to the literal values are further obtained. Thus, the information about executing instances as shown in FIG. 3 may be obtained. In particular, the table of FIG. 3 comprises 100 rows, each corresponding to an executing instance. In addition, the literal values employed in the executing instances and the corresponding filter factors are shown in the $2^{nd}$ and $3^{rd}$ columns of the table, respectively. Based on the table of FIG. 3, the execution profile of the query statement for a past time period can be known.

In one example, while sampling the executing instances, the occurrence times of respective literal values are also counted and recorded to indicate the usage profile of literal values. For example, by summarizing the 100 executing instances of FIG. 3, it can be known that, among the 100 samplings, there are 89 times the literal value is "China", 6 times it is "Vietnam", 4 times it is "Thailand", and only once it is "Cambodia". The literal value "China" has the highest usage frequency, being 89%. This information is described additionally in the "additional information" column of FIG. 3. In another embodiment, the summarizing of the usage of literal values may be performed in a subsequent step. In this case, FIG. 3 does not comprise the "additional information" column.

The usage frequency of literal values is a reflection of the execution history of the query statement, and may also be used to predict the subsequent execution profile. If a literal value has a relatively higher usage frequency, it can be predicted rationally that the literal value will also have a relatively higher occurrence probability during the subsequent execution. Therefore, considering the usage frequency of literal values when optimizing the access path may allow the optimized path to be adapted to the subsequent execution of the query statement better. However, generally speaking, one query statement usually has many possible literal values. If the access path is optimized according to the filter factor and usage profile of every literal value, it would cause too much calculating cost. Therefore, in many embodiments of the invention, the obtained executing instances are grouped into several groups, and the access path is optimized based on the filter factor and the occurrence frequency of each group, i.e., to execute step 12 of FIG. 1.

Specifically, step 12 groups the plurality of obtained executing instances into a plurality of groups based on the filter factors corresponding to the literal values in the executing instances, and obtains the average filter factor and the occurrence frequency for each group.

In one embodiment, step 12 is carried out by two sub steps. FIG. 4 shows sub steps of step 12 according to an embodiment of the invention. As shown in the figure, firstly in step 121, it classifies the plurality of obtained executing instances into a plurality of classes based on the literal values, and obtains the filter factor and the occurrence frequency of each class; and secondly in step 122, it clusters the plurality of classes into a plurality of groups based on the filter factor of each class, and obtains the average filter factor and the occurrence frequency of each group based on the filter factor and the occurrence frequency of each class. Next, the above sub steps will be described in conjunction with the information of the executing instances of FIG. 3.

In sub step 121, the executing instances are classified based on the literal values in the executing instances. In particular, the process may classify the executing instances having the same literal value into the same class, regard the filter factor corresponding to the same literal value as the filter factor of the class, and obtain the usage frequency of the literal value as the occurrence frequency of the class. In the 100 executing instances shown in FIG. 3, there are 4 different literal values in total, and thus the 100 executing instances may be classified into 4 classes, as shown in FIG. 5A. In FIG. 5A, the first class corresponds to the executing instances having the literal value "China". According to the information in FIG. 3, the literal value "China" corresponds to a filter factor of 88.6%. This filter factor may be used to represent the filter factor of the class. Furthermore, as all the executing instances having the literal value "China" are clustered in the first class, the number of the executing instances in the class is equal to the number of the executing instances having the literal value "China". If the occurrence frequency of a class is defined as the proportion of the number of executing instances in the class to the number of executing instances in total, the occurrence frequency of the class is similar to the usage frequency of the literal value in the class.

In one example, when sampling executing instances and thereby generating the executing instances information table shown as FIG. 3, the process has already counted the usage frequency of the literal value. In this case, the usage frequencies of the literal values of various classes may be obtained by referring to the additional information column of FIG. 3, and are used as the occurrence frequencies of the classes. In another example, the usage frequencies of literal values are not shown in the executing instances information table. In this case, during clustering the executing instances, the process counts and records the number of executing instances in each class, and thereby directly obtains the occurrence frequency of each class. In the example as shown in FIG. 5A, the occurrence frequency of each class is shown in the $3^{rd}$ column of the table; for example, the occurrence frequency of the first class is 89%, which corresponds to the usage frequency of the literal value ("China") as shown in the additional information column of FIG. 3.

Subsequently, for the classes shown in FIG. 5A, sub step 122 is performed to cluster the plurality of classes into a plurality of groups based on the filter factor of each class, and to obtain the average filter factor and the occurrence frequency of each group.

In one example, grouping is performed according to the "distances" among filter factors. For example, the classes for which the distances among filter factors are within a predetermined threshold, such as 5%, are clustered into the same group. Therefore, Classes 2-4 as shown in FIG. 5A may be clustered in a group, and Class 1 serves as a separate group. In other embodiments, clustering may be performed according to other standards, thereby obtaining groups. For example, the values of filter factors may be divided into a plurality of intervals, and the classes whose filter factors belong to the same interval may be clustered into a group. A person skilled in the art may employ other clustering methods, which are all encompassed in the scope of the invention.

For the obtained groups, the average filter factor and the occurrence frequency of each group are calculated. As the groups are obtained by clustering a plurality of classes, the occurrence frequency of a group may be calculated as the sum of the occurrence frequencies of all classes in the group. As for the filter factor, we may calculate the average value by many methods to serve as the average filter factor of the group. In one embodiment, the average filter factor may be calculated as the arithmetic mean of the filter factors of all classes in the group. In another embodiment, we may calculate the weighted mean of the filter factors of all classes by taking the relative occurrence frequencies of the classes in the group as weight. That is, the weight factor may be defined as the proportion of the occurrence frequencies of respective classes in the group to the total occurrence frequency of the group, and then, by using the weight factor, the weighted mean of the filter factors may be calculated as the average filter factor of the group.

FIG. 5B shows an example of groups of executing instances. As shown in the figure, according to the values of the filter factors, Class 1 in FIG. 5A is solely regarded as Group 1, and Classes 2-4 are clustered into Group 2. For Group 1, the occurrence frequency is the occurrence frequency of Class 1, i.e., 89%; and for Group 2, the occurrence frequency is the sum of the occurrence frequencies of Classes 2-4 in FIG. 5A, i.e., 11%. In the example of FIG. 5B, the average filter factor of a group is calculated by the way of weighted mean. Thus, the average filter factor of Group 2 is calculated as 5.6%*6%/11%+4.5%*4%/11%+1.3*1%/11%=4.8%. Thus, the occurrence frequency and the average filter factor of each group are obtained.

The example of FIG. 5A-5B shows an implementing mode to form groups of executing instances. It can be easily understood that, the number of executing instances Ni, the number of classes Nc and the number of groups Ng meet the following relationship: 1<=Ng<=Nc<=Ni. Generally, the number of Ni is significantly larger than the number of Ng and the number of Nc. However, depending on the rule of clustering, the number of classes Nc and the number of groups Ng may be equal.

Although an implementing mode of firstly classifying executing instances into classes and then clustering the classes into groups is described above in detail, it can be understood that those skilled in the art may employ other ways to obtain groups of executing instances. In one embodiment, the executing instances may be grouped into several groups directly based on, for example, the executing instances information table as shown in FIG. 3. For example, while scanning each executing instance one by one, the process may directly determine which group each executing instance should be put into based on the filter factor corresponding to the literal value; furthermore, during the process of putting executing instances into corresponding groups, it counts the number of executing instances and accumulates the filter factors. Thus, after scanning all executing instances, it may directly obtain the groups of executing instances. In addition, as it has already counted the number of executing instances in each group and accumulated the filter factors, also it can easily obtain the occurrence frequency of each group and the average filter factor from weighted calculation. Thus, the process can directly obtain the groups information shown in FIG. 5B from the executing instances information shown in FIG. 3, without the necessity of obtaining the classes information as shown in FIG. 5A firstly. Besides, after reading the specification, those skilled in the art may modify the way of forming groups in many aspects, for example, by changing the rule of grouping, changing the calculating method of occurrence frequency/average filter factor, and the like, thereby obtaining additional or different implementing modes. These implementing modes should be encompassed by the scope of the invention.

After obtaining the plurality of groups formed, by using an optimizer engine, it may obtain the access paths created for each group, i.e., to carry out step 13 of FIG. 1. In particular, the optimizer engine may create an economic access path for the query statement according to the filter factor, and may calculate the execution cost of the access path. In order to determine the access paths suitable for the groups obtained in step 12, in step 13, the average filter factors of the groups may be sent to the optimizer engine. Hence, the optimizer engine can determine preferred access paths based on the received filter factors. Thus, the process may obtain the access paths created based on the average filter factor of each group, which paths are referred to as candidate access paths hereinafter. In one example, for the groups shown in FIG. 5B, the process may obtain from the optimizer engine the candidate access paths A and B created for Groups 1 and 2, respectively. Subsequently, it determines, among the plurality of obtained candidate access paths, for example, A and B, which access path is more or most economic to the whole set of all groups.

This can cross check each candidate access path for each group, and determine the optimal access path based on the result of cross checking, as shown in step 14.

In particular, in step 14, by taking the occurrence frequencies as weights, the process calculates the weighted execution cost of each candidate access path for each group, and determines the candidate access path with the minimum sum of the weighted execution costs for all groups as the optimal access path.

In order to carry out step 14, firstly, the process obtains from the optimizer engine the execution cost of each candidate access path for each group. As described above, for a given filter factor f and a given access path P, the optimizer engine may calculate, when the filter factor is f, the execution cost generated when executing the query statement according to the access path P. Then, based on the average filter factors of the groups obtained in step 12 and the candidate access paths of the groups obtained in step 13, the optimizer engine can provide the execution cost of each candidate access path in the case of the average filter factor of each group. For example, for Groups 1-2 as shown in FIG. 5B and the candidate access paths A and B determined for the groups in step 13, the execution costs as shown in FIG. 6A may be obtained. As shown in FIG. 6A, the access path A has an execution cost of 485 in the case of Group 1 and an execution cost of 900 in the case of Group 2; the access path B has an execution cost of 1000 in the case of Group 1 and an execution cost of 750 in the case of Group 2. This result is consistent with that obtained in step 13, i.e., the access path A is more suitable for Group 1, and the access path B is more suitable for Group 2.

In one implementing mode, while obtaining from the optimizer engine the candidate access path of each group in step 13, the process firstly obtains the execution cost of the candidate access path for the corresponding group. For example, while obtaining the access paths A and B, it firstly obtains the execution cost of the path A for Group 1 and the execution cost of the path B for Group 2. Then, by sending a request, it obtains from the optimizer engine the execution costs of each candidate access path for other groups, for example, the cost of the path A for Group 2 and the cost of the path B for Group 1. Thus, it finally obtains the execution cost of every candidate access path for every group.

Subsequently, the process further considers the occurrence frequencies of the groups, and weights the execution costs by taking the occurrence frequency as the weight factor, thereby obtaining the weighted execution cost of each candidate access path for each group, as shown in FIG. 6B. By multiplying the execution costs by the occurrence frequencies of the groups, the following result may be obtained: the access path A has a weighted execution cost of 430 in the case of Group 1 and a weighted execution cost of 102 in the case of Group 2; the access path B has a weighted execution cost of 886 in the case of Group 1 and a weighted execution cost of 85 in the case of Group 2.

Then, based on the weighted execution costs, the process calculates the sum of the weighted execution costs of each candidate access path for all the groups, and determines the candidate access path with the minimum sum of the weighted execution costs as the optimal access path. For example, in the example of FIG. 6B, it may conclude from calculation that, if both Groups 1 and 2 are executed in line with the access path A, the sum of the weighted execution costs will be 430+101=532; if both Groups 1 and 2 are executed in line with the access path B, the sum of the weighted execution costs will be 886+85=971. In this example, access path A has the minimum sum of the weighted execution costs for all the groups, and therefore it can be determined as the more preferred access path for the entirety of all groups. Thus, by cross checking, the process determines the optimal access path for the set of all groups.

Thus, in steps 11-14, the process obtains a plurality of executing instances by monitoring the execution history of a query statement, then groups these executing instances into a plurality of groups, and determines the access path suitable for the query statement based on the occurrence frequency and filter factor of each group. As the access path optimization is based on the execution history statistics of the query statement during a past time period, the optimizing procedure may be statically performed before subsequently executing the query statement, without the necessity of re-estimating filter factor and re-optimizing path in runtime. Thus, the optimizing procedure would neither increase expenses, nor occupy resources of the runtime. In addition, as the access path is predetermined before the execution, the access path thus obtained is relatively stable and can be backtracked. In this aspect, with the successive execution of the query statement, it may update the execution history at regular intervals, that is, to add new executing instances or replace the previous executing instances with new executing instances, such that the obtained executing instances can more accurately reflect the execution profile of the query statement during a past time period. In addition, in the above optimizing solution, the executing instances are processed after being grouped, which allows the analysis on the executing instances to be simpler and more targeted, and then allows the execution of the optimizing solution to be more effective. Furthermore, according to the above optimizing solution, when determining the optimal access path, the filter factors and the occurrence frequencies of all groups are considered synthetically. By taking occurrence frequencies as the weight factor, the access path optimization favors the groups with higher occurrence frequencies. On the other hand, a group with high occurrence frequency means that the group corresponds to a literal value with high usage frequency, which implies that these literal values will have relatively high occurrence possibilities accordingly in the subsequent query execution. Therefore, as occurrence frequencies are considered, the obtained access path has more possibilities of being adapted to the subsequent query execution.

By the above steps 11-14, the process obtains a single access path adapted to the set of all groups. In a further embodiment, it may further judge the possibility of employing a combination of multiple access paths. In particular, in the above step 14, the process has obtained the weighted execution cost of each candidate access path for each group. Then, it may sum up the weighted execution costs of the respective groups under their corresponding candidate access paths, thereby obtaining the weighted execution costs of a plurality of access paths. However, if a plurality of access paths is employed, there may cause an extra cost when switching the paths. Therefore, the total costs of the multiple paths solution may be considered as the weighted execution costs of the multiple access paths plus the costs for path switching. If the total costs of the multiple paths solution are less than the total execution costs of the above single access path, it will be considered that the multiple paths solution is preferred; otherwise, the single access path solution will be employed. For example, with reference to FIG. 6B, the access path A has a weighted execution cost of 430 in the case of Group 1, and the access path B has a weighted execution cost of 85 in the case of Group 2. Therefore, if the access path A is used for Group 1 and the access path B is used for Group 2, that is, to employ a combination of multiple access paths, the multiple access paths will have a weighted execution cost of 515. Suppose each time of path switching incurs an additional cost of 50, the total costs of the multiple paths solution will be 565. The cost is larger than the total execution cost 532 when the access path A is used for all groups. Therefore, in this example, it is preferable to employ the single path solution. In other examples, however, if the total costs of multiple paths solution are less, it will be preferable to use a combination of multiple paths. In multiple paths solution, it may be necessary to judge the filter factor of the query statement when it is executed in order to determine which group it belongs to.

In above examples, all the description is made in conjunction with the COUNTRY column of the User Information Statistics Table T1 and the query statement SELECT*FROM T1 WHERE COUNTRY=var. This query statement comprises only one filter condition "COUNTRY=var". Accordingly, the information on each executing instance of the query statement comprises only one literal value and one corresponding filter factor. In some cases, however, one query statement may comprise more than one filter condition. For the query statement with multiple filter conditions, the steps of FIG. 1 may still be performed similarly, except that the literal value in the executing instance is considered as a set of literal values, and the filter factor is considered as a set of the corresponding filter factors.

In one example, by using the query statement SELECT*FROM T2 WHERE SEX=? AND JOB=?, a query is conducted on the SEX column and the JOB column of the Staff Information Statistics Table T2. The query statement comprises two filter conditions: SEX=? and JOB=?. In step 11, by monitoring the execution history of the query statement, the executing instances information may be obtained as shown in FIG. 7A. In particular, in the information table of FIG. 7A, each executing instance information comprises a set of the literal values of the query statement in the executing instance, for example, <'M', 'DESIGNER'>, <'F', 'SALES-REP'>, and a set of filter factors corresponding to the set of literal values, for example, <0.8, 0.4>, <0.2, 0.3>, etc. As the query statement comprises two filter conditions, each set of literal values and each set of filter factors comprise two elements.

Subsequently, in step 12, the process groups the executing instances of FIG. 7A into groups based on the set of filter factors. As described above, there are many ways to group the instances. For a filter factor set comprising two elements, it may define a two-dimensional distance, calculate the two-dimensional distance of the filter factor set, and conduct the grouping based on the distance. After groups are formed, it may obtain the occurrence frequency and a set of average filter factors for each group in a similar way. The set of average filter factors may be obtained in many ways, such as arithmetic mean or weighted mean. Suppose that in one example, the executing instances of FIG. 7A are grouped into Groups 1-3 shown in FIG. 7B according to a certain grouping way, and for each group the occurrence frequency and a set of average filter factors are obtained.

Then, the process obtains a candidate access path based on the set of average filter factors of each group, i.e., to perform step 13. It is supposed herein that candidate access paths A, B, and C are obtained for Groups 1-3 shown in FIG. 7B, respectively.

Next, in step 14, the process cross checks each group and each candidate access path, and determines an access path suitable for all groups. In the example of FIG. 7B, there are three groups 1-3 and three candidate access paths A, B, and C, and therefore, the result of cross check is shown more clearly in the form of matrix in FIG. 7C. By calculating the weighted execution cost of each group under each candidate access path, it can be known that Path B has the minimum total execution cost, and may be determined as the optimal access path. The realization of this step is the same as in the case of the query statement with a single filter condition.

Knowing the above example of the query statement comprising two filter conditions, those skilled in the art can easily analogize the number of filter conditions to three, four or more, such that the optimizing solution of the embodiments of the invention may be adapted to various cases of query statements.

Figure 8:
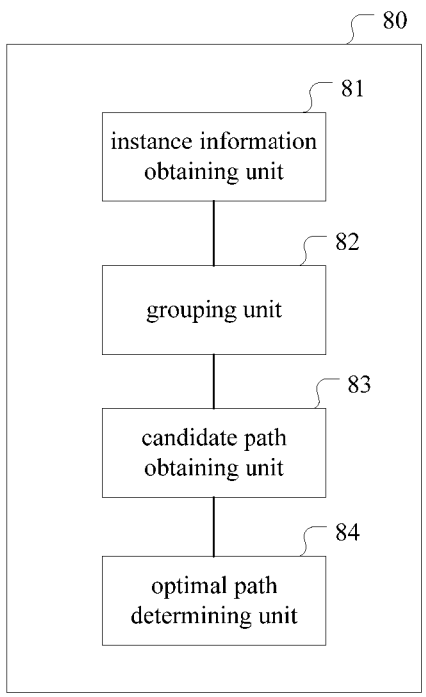
FIG. 8 is a block diagram showing an apparatus for optimizing an access path according to an embodiment of the invention.

The method for optimizing access path is described above in conjunction with detailed examples. Based on the same inventive concept, the embodiment of the invention further provides an apparatus for optimizing access path. FIG. 8 is a block diagram showing an apparatus for optimizing access path according to an embodiment of the invention, and more particularly, the apparatus is used to optimize the access path of repeatedly executed query statement in database. As shown in the figure, the optimizing apparatus 80 comprises: an instance information obtaining unit 81, configured to monitor and sample the execution of a query statement to obtain the information about a plurality of executing instances, wherein the information about each executing instance comprises the literal value of the query statement in the executing instance and the filter factor corresponding to the literal value; a grouping unit 82, configured to group the plurality of executing instances into a plurality of groups based on the filter factors corresponding to the literal values, and obtain the average filter factor and the occurrence frequency for each group; a candidate path obtaining unit 83, configured to obtain the candidate access path created for the average filter factor of each group; and an optimal path determining unit 84, configured to, by taking the occurrence frequencies as weights, calculate the weighted execution cost of each candidate access path for each group, and determine the candidate access path with the minimum sum of the weighted execution costs for all groups as the optimal access path.

In one embodiment, the above grouping unit 82 further comprises subunits or modules to realize the grouping of the executing instances (not shown). In particular, in one example, the grouping unit 82 may comprise a classifying module, configured to classify the plurality of obtained executing instances into a plurality of classes based on the literal values, and obtain the filter factor and the occurrence frequency of each class; and a clustering module, configured to cluster the plurality of classes into a plurality of groups based on the filter factor of each class, and obtain the average filter factor and the occurrence frequency of each group based on the filter factor and the occurrence frequency of each class.

In one embodiment, the optimizing apparatus 80 of FIG. 8 further comprises a multiple-paths determining unit (not shown), configured to obtain the total execution costs of a combination of multiple candidate access paths, and compare it with the total execution costs of the single optimal access path determined by the optimal path determining unit 84, thereby determining the most preferred access path.

The detailed implementing modes of the above mentioned units or modules will be omitted herein for reference can be made to the detailed description in conjunction with the method process and detailed examples hereinbefore.

It can be understood that the above path optimizing apparatus 80 may be embedded into or attached to the optimizer of an existing database system as function enhancement. In this case, the candidate path obtaining unit 83 and the optimal path determining unit 84 may, inside the optimizer, directly obtain from the optimizer engine the candidate access paths and the corresponding costs. In another embodiment, the apparatus 80 may be arranged as an independent tool at the periphery of an existing optimizer, for example, being arranged on the client-side. In this case, the apparatus 80 may communicate with the optimizer via various wired or wireless ways by using various communication protocols, thereby sending data, such as filter factors, to the optimizer, and receiving from the optimizer the desired data, such as the candidate access paths and the corresponding costs. In another embodiment, the units in the apparatus 80 are realized in a distributed form.

Figure 9:
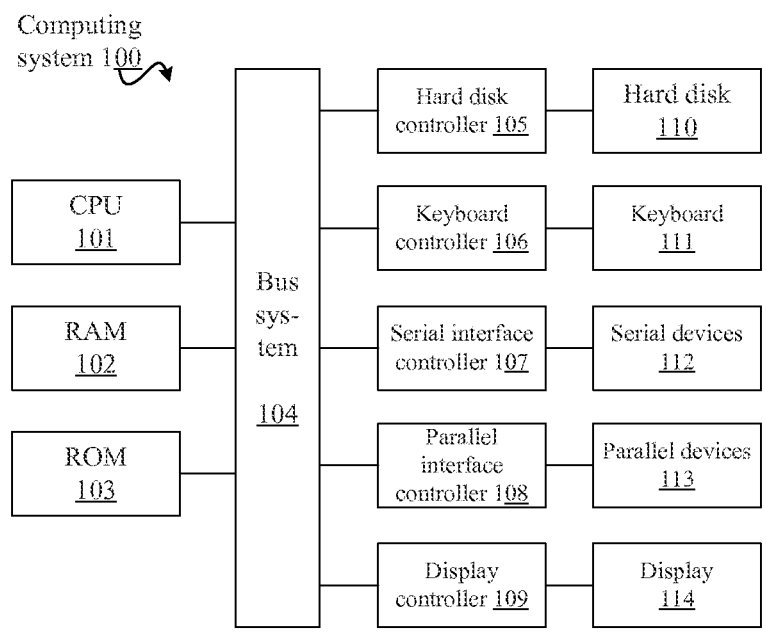
FIG. 9 is a block diagram showing an exemplary computing system suitable to implement the embodiments of the invention.

The method and apparatus for optimizing access path in database as described above may be realized by using a computing system. FIG. 9 is a block diagram showing an exemplary computing system 100 suitable to implement the embodiments of the invention. As shown, the computer system 100 may comprise: a CPU (Central Processing Unit) 101, a RAM (Random Access Memory) 102, a ROM (Read-Only Memory) 103, a system bus 104, a hard disk controller 105, a keyboard controller 106, a serial interface controller 107, a parallel interface controller 108, a display controller 109, a hard disk 110, a keyboard 111, a serial external device 112, a parallel external device 113 and a display 114. Among these devices, the system bus 104 couples to the CPU 101, the RAM 102, the ROM 103, the hard disk controller 105, the keyboard controller 106, the serial controller 107, the parallel controller 108 and the display controller 109. The hard disk is coupled to the hard disk controller 105, the keyboard 111 is coupled to the keyboard controller 106, the serial external device 112 is coupled to the serial interface controller 107, the parallel external device 113 is coupled to the parallel interface controller 108, and the display 114 is coupled to the display controller 109. It is appreciated that, the structural block diagram shown in FIG. 10 is merely for purpose of illustration, rather than being a limitation to the scope of the invention. In some circumstances, certain devices may be added or removed based on actual condition.

The flowcharts and block diagrams in the accompany drawing illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although respective apparatus and method of the present invention have been described in detail in conjunction with specific embodiments, the present invention is not limited thereto. Under teaching of the specification, various changes, replacements and modifications may be made to the invention by those skilled in the art without departing from the spirit and scope of the invention. It is appreciated that, all such changes, replacements and modifications still fall within the protection scope of the invention. The scope of the invention is defined by the appended claims.

What is claimed is:

1. A method for optimizing an access path in a database, comprising:
    sampling execution of a query statement to obtain information about a plurality of executing instances, wherein the information about each executing instance comprises a literal value of the query statement in the executing instance and a filter factor corresponding to the literal value;
    grouping the plurality of executing instances into a plurality of groups based on the filter factors corresponding to the literal values, and obtaining an average filter factor of each group and an occurrence frequency of the group;
    obtaining a candidate access path created for the average filter factor of each group; and
    by taking the occurrence frequencies as weights, calculating a weighted execution cost of each candidate access path for each group, and determining the candidate access path with a minimum sum of the weighted execution costs for all groups as an optimal access path,
    wherein said grouping the plurality of executing instances into a plurality of groups based on the filter factors corresponding to the literal values and obtaining the average filter factor of each group and the occurrence frequency of the group comprises:
    classifying the plurality of obtained executing instances into a plurality of classes based on the literal values, and obtaining the filter factor and the occurrence frequency of each class; and
    clustering the plurality of classes into a plurality of groups based on the filter factor of each class in the plurality of classes, and obtaining the average filter factor and the occurrence frequency of each group based on the filter factor and the occurrence frequency of every class, and
    wherein said clustering the plurality of classes into a plurality of groups based on the filter factor of every class comprises one of the following steps:
    clustering a portion of the plurality of classes for which distances among the filter factors are within a predetermined threshold into a same group; and
    dividing values of the filter factors into a plurality of intervals, and clustering the portion of the plurality of classes whose filter factors belong to a same interval into the same group.

2. The method according to claim 1, wherein said obtaining the information about a plurality of executing instances comprises obtaining the literal value of the query statement in each executing instance, and obtaining the filter factor corresponding to the literal value by at least one of:
    referring to statistics information of a table that the query statement is directed to, and obtaining the filter factor according to the statistics information; and
    executing a count statement for the query statement, and calculating the filter factor according to a result of executing the count statement.

3. The method according to claim 1, wherein said classifying the plurality of obtained executing instances into a plurality of classes based on the literal values, and obtaining the filter factor and the occurrence frequency of each class, comprises:
    classifying the plurality of obtained executing instances having the same literal value into a same class, regarding the filter factor corresponding to the same literal value as the filter factor of the class, and obtaining a usage frequency of the literal value as the occurrence frequency of the class.

4. The method according to claim 1, wherein said grouping the plurality of executing instances into a plurality of groups based on the filter factors corresponding to the literal values, and obtaining the average filter factor of each group and the occurrence frequency of the group, comprises:

while scanning each executing instance, directly determining which group the executing instance should be put into based on the filter factor corresponding to the literal value;

during the process of putting the executing instances into corresponding groups, counting the number of executing instances in each group, and accumulating the filter factors; and obtaining the occurrence frequency of the group based on the counting of the executing instances in each group, and obtaining the average filter factor of the group based on the accumulation of the filter factors.

5. The method according to claim 1, wherein said calculating the weighted execution cost of each candidate access path for each group comprises:

obtaining the execution cost of each candidate access path for each group; and multiplying the execution cost by the occurrence frequency of the corresponding group as a weight factor, thus obtaining the weighted execution cost of each candidate access path for each group.

6. The method according to claim 1, further comprising: obtaining total execution costs of a combination of multiple candidate access paths, and comparing the total execution costs with other total execution costs of said optimal access path, thereby determining a most preferred access path.

7. The method according to claim 1, wherein the query statement comprises two or more filter conditions, the literal value comprises a set of literal values, and the filter factor comprises a set of filter factors.

8. A method for optimizing an access path in a database, comprising:

sampling execution of a query statement to obtain information about a plurality of executing instances, wherein the information about each executing instance comprises a literal value of the query statement in the executing instance and a filter factor corresponding to the literal value;

grouping the plurality of executing instances into a plurality of groups based on the filter factors corresponding to the literal values, and obtaining an average filter factor of each group and an occurrence frequency of the group;

obtaining a candidate access path created for the average filter factor of each group; and by taking the occurrence frequencies as weights, calculating a weighted execution cost of each candidate access path for each group, and determining the candidate access path with a minimum sum of the weighted execution costs for all groups as an optimal access path, wherein said grouping the plurality of executing instances into a plurality of groups based on the filter factors corresponding to the literal values and obtaining the average filter factor of each group and the occurrence frequency of the group comprises:

classifying the plurality of obtained executing instances into a plurality of classes based on the literal values, and obtaining the filter factor and the occurrence frequency of each class; and clustering the plurality of classes into a plurality of groups based on the filter factor of each class in the plurality of classes, and obtaining the average filter factor and the occurrence frequency of each group based on the filter factor and the occurrence frequency of every class, and wherein said obtaining the average filter factor and the occurrence frequency of each group based on the filter factor and the occurrence frequency of each class comprises:

calculating the sum of the occurrence frequencies of the classes as the occurrence frequency of the group; and calculating the average filter factor of the group by at least one of:

calculating an arithmetic mean of the filter factors of the classes as the average filter factor of the group; and calculating a weighted mean of the filter factors of the classes as the average filter factor of the group by taking the relative occurrence frequencies of the classes in the group as weights.

9. An apparatus for optimizing an access path in a database, comprising:

an instance information obtaining unit configured to sample execution of a query statement to obtain information about a plurality of executing instances, wherein the information about each executing instance comprises a literal value of the query statement in the executing instance and a filter factor corresponding to the literal value;

a grouping unit configured to group the plurality of executing instances into a plurality of groups based on the filter factors corresponding to the literal values, and obtain an average filter factor of each group and an occurrence frequency of the group;

a candidate path obtaining unit configured to obtain a candidate access path created for the average filter factor of each group; and an optimal path determining unit configured to, by taking the occurrence frequencies as weights, calculate a weighted execution cost of each candidate access path for each group, and determine the candidate access path with a minimum sum of the weighted execution costs for all groups as an optimal access path and wherein the grouping unit comprises:

a classifying module configured to classify the plurality of obtained executing instances into a plurality of classes based on the literal values, and obtain the filter factor and the occurrence frequency of each class; and a clustering module configured to cluster the plurality of classes into a plurality of groups based on the filter factor of each class in the plurality of classes, and obtain the average filter factor and the occurrence frequency of each group based on the filter factor and the occurrence frequency of every class, and wherein the clustering module is configured to perform one of the following:

clustering a portion of the plurality of classes for which distances among the filter factors are within a predetermined threshold into a same group; and dividing values of the filter factors into a plurality of intervals, and clustering the portion of the plurality of classes whose filter factors belong to a same interval into the same group.

10. The apparatus according to claim 9, wherein the instance information obtaining unit is configured to obtain the literal value of the query statement in each executing instance, and obtain the filter factor corresponding to the literal value by at least one of:

referring to statistics information of a table that the query statement is directed to, and obtaining the filter factor according to the statistics information; and executing a count statement for the query statement, and calculating the filter factor according to a result of executing the count statement.

11. The apparatus according to claim 9, wherein the classifying module is configured to:
classify the plurality of obtained executing instances having the same literal value into a same class, regard the filter factor corresponding to the same literal value as the filter factor of the class, and obtain the usage frequency of the literal value as the occurrence frequency of the class.

12. The apparatus according to claim 9, wherein the clustering module is configured to:
calculate a sum of the occurrence frequencies of the classes as the occurrence frequency of the group; and
calculate an average filter factor of the group by at least one of:
calculating an arithmetic mean of the filter factors of the classes as the average filter factor of the group; and
calculating a weighted mean of the filter factors of the classes as the average filter factor of the group by taking the relative occurrence frequencies of the classes in the group as weights.

13. The apparatus according to claim 9, wherein the grouping unit is configured to:
while scanning each executing instance, directly determine which group the executing instance should be put into based on the filter factor corresponding to the literal value;
during the process of putting the executing instances into corresponding groups, count the number of executing instances in each group, and accumulate the filter factors; and
obtain the occurrence frequency of the group based on the counting of the executing instances in each group, and obtain the average filter factor of the group based on the accumulation of the filter factors.

14. The apparatus according to claim 9, wherein the optimal path determining unit is configured to:
obtain the execution cost of each candidate access path for each group; and
multiply the execution cost by the occurrence frequency of the corresponding group as a weight factor, thus obtaining the weighted execution cost of each candidate access path for each group.

15. The apparatus according to claim 9, further comprising: a multiple-paths determining unit configured to obtain the total execution costs of a combination of multiple candidate access paths, and compare the total execution costs with other total execution costs of said optimal access path, thereby determining a most preferred access path.

16. The apparatus according to claim 9, wherein the query statement comprises two or more filter conditions, the literal value comprises a set of literal values, and the filter factor comprises a set of filter factors.

\* \* \* \* \*